United States Patent [19]
Haupt et al.

[11] 3,833,883
[45] Sept. 3, 1974

[54] THRESHOLD FORMING CIRCUIT

[75] Inventors: Gerhard Haupt; Wilfried Kochert, both of Konstanz, Germany

[73] Assignee: Licentia Patent-Verwaltungs-GmbH, Frankfurt, Germany

[22] Filed: Mar. 23, 1973

[21] Appl. No.: 344,150

[30] Foreign Application Priority Data

Mar. 25, 1972 Germany .......................... 2214658

[52] U.S. Cl. ...................................... 340/146.3 AG
[51] Int. Cl. ............................................ G06k 9/00
[58] Field of Search .......................... 340/146.3 AG

[56] References Cited

UNITED STATES PATENTS 3,560,931 2/1971 Neville ...................... 340/146.3 AG
3,701,099 10/1972 Hall et al. ................ 340/146.3 AG

*Primary Examiner*—Paul J. Henon
*Assistant Examiner*—Leo H. Boudreau
*Attorney, Agent, or Firm*—Spencer & Kaye

[57] ABSTRACT

A threshold forming circuit for use in a character recognition system includes a plurality of scanners and associated signal processing channels, arranged in scanning groups. Threshold values are produced for use in evaluating the signals in each of the processing channels. The threshold values are generated by a signal processing circuit in dependence upon the scanning signals. The signal processing circuit includes a plurality of processing units, where there is one such unit associated with each scanning group. Each unit includes a maximum amplitude filter which is connected to each of the signal processing channels of the respective group and generates an output signal dependent upon the highest scanning signal in the group. A group threshold setting circuit is connected within each of the units to the maximum amplitude filter and produces a threshold value which is dependent upon the signal from its associated maximum amplitude filter and the signals generated by the filters of the other scanning groups. This threshold value is then utilized in a threshold circuit for assisting in the evaluation of the signals on the processing channels.

8 Claims, 3 Drawing Figures

PATENTED SEP 3 1974

3,833,883

THRESHOLD FORMING CIRCUIT

BACKGROUND OF THE INVENTION

The present invention relates to a circuit for forming threshold values for use in the evaluation of the signals from a plurality of scanners and associated signal processing channels in a character recognition system.

German Published Pat. application (Auslegeschrift) DAS No. 1,065,128 discloses a circuit for converting analog scanned signals into digital values before the signals are evaluated. This conversion is accomplished by comparing the analog values with a settable threshold value, where all values above the threshold value are evaluated as Yes (binary "1") and values below the threshold are evaluated as No (binary "0"). In the disclosed circuit, the threshold value is set in dependence upon the signal sensed by an auxiliary probe which scans only the background of the character. Such an arrangement makes it possible to either raise or lower the threshold value to produce a uniform contrast corresponding to the degree of remission of the character background. Differences in the contrast of the character itself, however, cannot be compensated for by such an arrangement for forming the threshold value.

SUMMARY OF THE INVENTION

An object of the present invention is to form threshold values whose level can be set in dependence upon the contrast of the character.

This object is accomplished by the present invention in that the plurality of scanners and their associated signal processing channels are segmented into scanning groups, which are associated to a scanning range and the signals in each of these groups are fed into a signal processing circuit for forming the threshold values. The signal processing circuit includes a plurality of processing units each associated with a different group. In each unit, there is a maximum amplitude filter, which is connected to all of the processing channels of the respective group, for determining the highest scanning signal of this group. The signal from each maximum amplitude filter is then fed to a group threshold setting circuit of the processing unit in order to set the threshold value in the threshold value circuit of the respective processing unit of the group.

A further embodiment of the present invention provides that a minimum threshold value can be set by the group threshold setting circuit.

It is further provided that the minimum threshold value is set in a common threshold setting circuit which is associated with all of the groups. This minimum threshold value is set in dependence upon the signal from a further maximum amplitude filter which determines the highest signal among the maximum amplitude filters assigned to each individual group.

It is further provided that a threshold value be set, via the group threshold setting circuits, in dependence on the minimum threshold value and on the signals from the maximum amplitude filters of the adjacent groups.

It is further provided that a certain percentage, particularly one-half, of the voltage emitted by the maximum amplitude filter of the associated group be set as the threshold voltage by the group threshold setting circuits.

The threshold value can be determined by the group threshold setting circuit selecting the higher of two voltage values, the first being the partial output voltage of the maximum amplitude filter of the associated group and the second being a voltage which is formed in dependence on the minimum threshold value generated by the common threshold setting circuit and the signals of the maximum amplitude filters of the adjacent group. The higher of these two values which is selected is utilized as the threshold voltage.

A preferred embodiment of the present invention provides that the common threshold setting circuit for setting the minimum threshold value includes a distortion circuit which enlarges the signals of the maximum amplitude filters towards higher values.

In a preferred embodiment of the distortion circuit, an operational feedback amplifier is utilized to distort the signal from the maximum amplitude filter of the common threshold setting circuit. The feedback path of the operational amplifier includes a resistor connected in parallel with the emitter-collector path of a transistor.

In a special further embodiment of the circuit, the group threshold setting circuits include: a setting unit to set a partial value dependent upon signals from the associated maximum amplitude filter which are amplified in an amplifier with a ratio represented by the values of one resistance to another resistance, a resistance network to link the signals of adjacent maximum filters with the minimum threshold value and a maximum amplitude filter to select the higher signal from the output signals of the setting unit and the resistance network.

In order to simplify the circuit in those devices where only one or the other of the two outer scanning groups receives scanned signals for a character at any one time, these groups are connected together to a common maximum filter and a common group threshold setting circuit.

DESCRIPTION OF THE PREFERRED EMBODIMENTS

Figure 1:
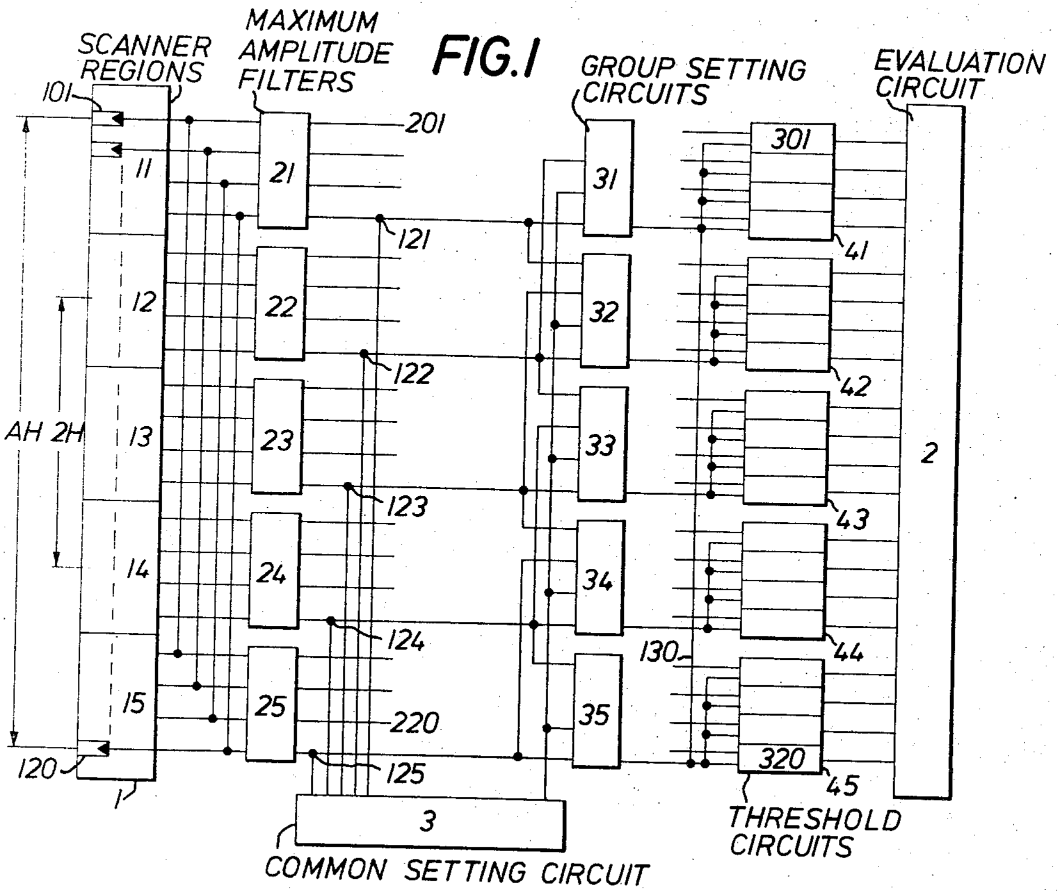
FIG. 1 is a block circuit diagram of a threshold forming circuit according to the present invention.

FIG. 1 shows a photosensor mount 1 including photosensors 101 to 120 arranged one on top of the other for scanning columns of character patterns moving past the mount 1 in a horizontal direction. Each one of these photosensors is connected to a respective one of the signal processing channels 201 to 220, where the scanning signals are transmitted through respective threshold circuits 301 to 320, which can be, for example, comparator amplifiers, to an evaluation circuit 2. These threshold circuits receive a threshold value which each scanned signal must at least reach in order to produce a digital signal at the output of its respective threshold circuit. For example when a black element is scanned a Yes ("1") is to be produced. The signal is then fed to the evaluation circuit 2. One threshold value is fed at each scanning moment to a respective group 41 to 45 each composed of four adjacent threshold members 301 to 304, 305 to 309, etc.

The photosensors are assigned to scanning regions 11 to 15 so as to correspond to this grouping. A respective maximum amplitude filter 21 to 25 is connected to the four signal processing channels of each scanned region and emits at its output 121 to 125 the highest scanned signal occurring in the group of the four associated signal processing channels. Furthermore, the output of the maximum amplitude filter of each group of signal processing channels is connected to a respective group threshold setting circuit 31 to 35 for setting a common threshold value in the threshold circuits 301–320 for each of the channels of the respective group.

The output of each maximum filter is connected with the group threshold setting circuit of the associated group as well as with the group threshold setting circuit of the immediately adjacent groups and with a common threshold setting circuit 3 common to all groups, which forms a minimum threshold value in the group threshold setting circuits. This minimum threshold value, formed by the common circuit 3, is applied to all of the groups.

Figure 2:
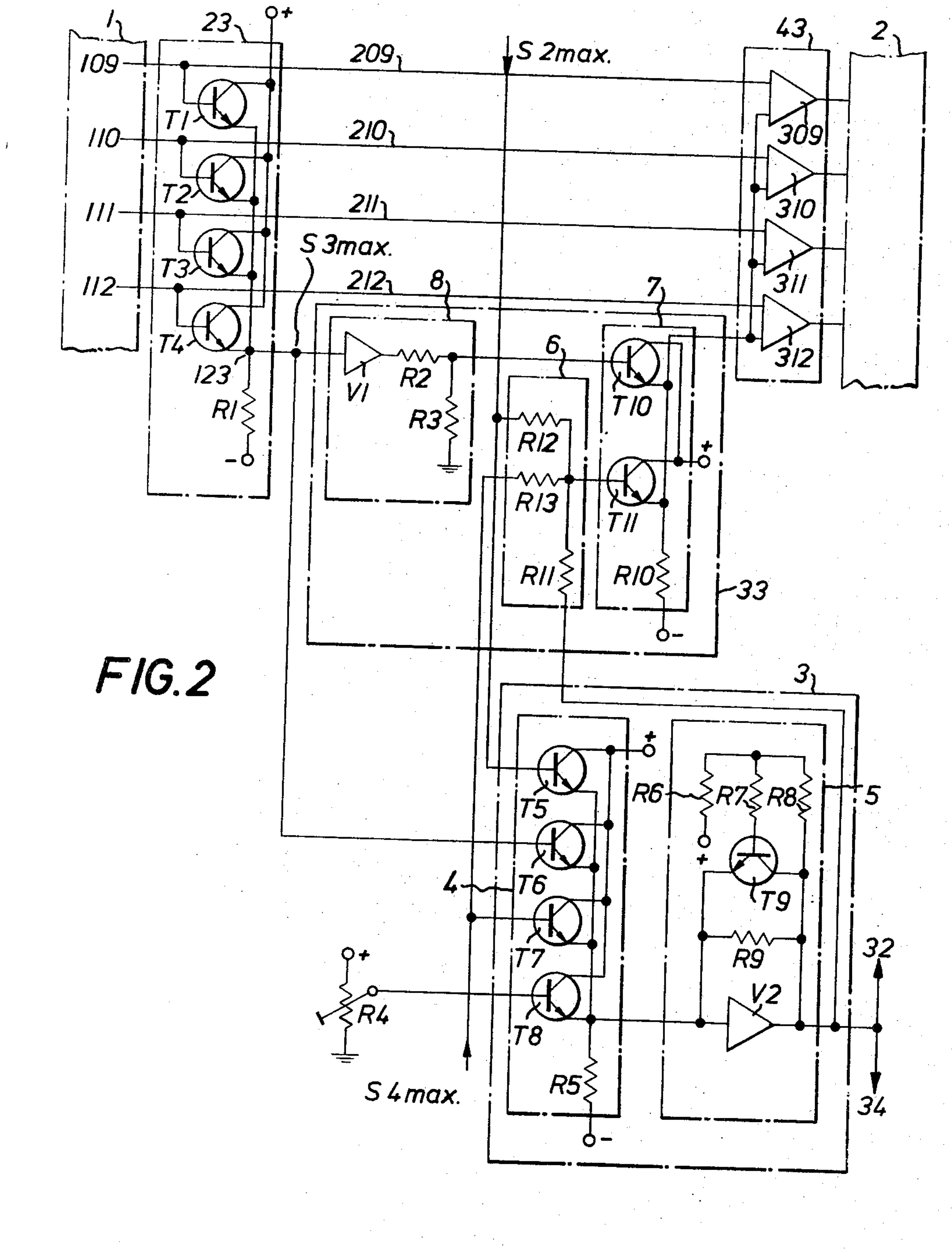
FIG. 2 is a circuit diagram of the components of the circuit of FIG. 1.

FIG. 2 shows the details of the circuitry for forming the threshold value for the center scanning region 13 of FIG. 1. The maximum amplitude filter 23 includes four transistors T1 to T4 whose bases are each connected to a respective one of the photosensors 109 to 112. The collectors of the transistors T1 to T4 are connected together to receive a positive supply voltage and the emitters are also connected together to receive a negative supply voltage via a resistor R1. Only the highest respective signal S3max of the scanning region 13 appears at the output terminal 123, at the positive end of the resistor R1, of this maximum amplitude filter 23.

This output of the maximum amplitude filter 23 is connected to the group threshold setting circuit 33 as well as to the common threshold setting circuit 3. This common threshold setting circuit 3 includes a maximum amplitude filter 4 with $n + 1$ transistors, where $n$ is the number of groups which are formed, of which only four transistors T5 to T8 are shown. The collectors of these transistors T5 to T8 are connected together to a positive supply voltage and the emitters of these transistors are connected together, via a resistor R5, to a negative supply voltage. The output of this maximum amplitude filter 4 is located at the positive end of the resistor R5. A distortion circuit 5 for setting the minimum threshold value is connected to the output of the filter 4. The bases of transistors T5 to T7 receive the respective highest scanned signal S2max, S3max, S4max of the scanning regions 12, 13 and 14, which signals appear at terminals 122, 123 and 124 in FIG. 1. The maximum voltages from the other scanning regions reach the other transistors (not shown) in the same manner. A setting resistor R4 permits the setting of a voltage at the base of transistor T8 which voltage serves as the fixed minimum threshold value.

The distortion circuit 5 contains an operational feedback amplifier V2, which due to the parallel connection of a resistor R9 with the emitter-collector path of a transistor T9 has a nonlinear feedback. Resistors R6, R7 and R8 determine the quiescent point of this transistor T9 and the characteristic for the operational amplifier V2.

Figure 3:
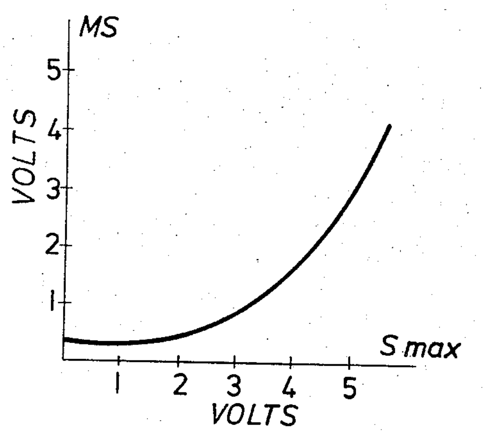
FIG. 3 is a distortion curve for the distortion circuit of FIG. 2.

FIG. 3 shows the characteristic of this distortion circuit 5 which illustrates the dependence of the minimum threshold value MS on the signal Smax from the maximum filter 4. In the region from 0 to 1 volt a fixed value which can be set by resistor R4 is effective as the minimum threshold value. In the present diagram the distortion characteristic in this lower area is relatively linear. With increasing voltage Smax, the minimum threshold begins to rise at a more rapid rate.

Returning to FIG. 2, the minimum threshold value is fed to network 6 of the group threshold setting circuit 33 along with signals S2max and S4max by the resistors R11, R12, R13, which are joined to form a node. The ratio of each of the resistances R12 and R13 to resistance R11 may be 2:1, for example. The node of network 6 is connected to the base of transistor T11 which is part of a maximum amplitude filter 7 which forms the final point in the group setting stage.

In addition to the transistor T11, a transistor T10 also forms part of the maximum amplitude filter 7. The base of the transistor T10 is connected with a setting unit 8, which is connected to the output 123 of the maximum amplitude filter 23 so as to provide another input into the group threshold setting circuit 33. In this setting unit 8, the signal S3max of the maximum amplitude filter 23 is first amplified by an amplifier V1. A voltage divider R2, R3 then transmits a portion of the amplified signal, e.g., one-half, to the base of transistor T10. The collectors of both transistors T10 and T11 are connected to the positive supply voltage and the emitters to the negative supply voltage, via resistor R10. The higher signal of the signals from the setting unit 8 and the resistance network 6 appears at the more positive side of this resistor R10, which signal is then fed to the connected inputs of the threshold circuits 309–312 of group 43 as the threshold value.

In the embodiment shown in FIG. 1, it is assumed that a character height 2H can be scanned by using only the circuit groups of scanning regions 12 to 14.

Due to possible shifts in the recording carriers (not shown) in the transporting device (also not shown), however, the additional scanning regions 11 and 15 are provided so that a total scanning height AH can be covered. Since each scanned character has a height of only 2H, only one of these two additional scanning regions 11 and 15, can receive scanning signals at a time, so that it is possible to process the threshold formation for these scanning regions together. The signal processing channels of the two scanning regions may be connected together to the same maximum amplitude filter, e.g., 25, and to the same group threshold setting circuit, e.g., 35. The maximum amplitude filter 21 and the group threshold setting circuit 31 may then be eliminated. Groups 41 and 45 of the threshold circuits will then also be connected together (connection 130 in FIG. 1). Since in practice a much higher total number of scanning channels will be required, the saving of circuit groups becomes of significant interest.

As has been pointed out above, the circuit produces an adjustable setting of the threshold values in the signal processing channels which is automatically controlled by the scanning signals. The threshold value has the same amplitude for all channels of each group. With irregularly defined contrast in a character, the amplitude of the threshold value is adapted to the respective contrast in a scanning region. Portions of a character having only weak contrast will not be lost this way since for such portions of the character the associated threshold value is correspondingly lowered.

On the other hand, however, the circuit of the present invention ensures that the threshold value cannot drop too low in the inner character field where there is no contrast. This prevents signals originating from smudges in the character background from being evaluated. For example, no contrast exists in the interior of the character "0." In this case the threshold value is set by the contrast of the upper and lower arc of the character which can be scanned in the adjacent regions.

Smudges in the character background are known to occur most frequently with "bold face" characters which have strong contrasts, because bold face print usually originates from new color ribbons or sheets which are still relatively wet and thus might splash. The distortion circuit 5 prevents the evaluation of signals produced by color splashes under such circumstances since it increases the height of the minimum threshold value when there is a stronger contrast in the character.

It will be understood that the above description of the present invention is susceptible to various modifications, changes and adaptations and the same are intended to be comprehended within the meaning and range of equivalents of the appended claims.

We claim:

1. In a system for forming a threshold value for use in evaluating the scanning signals produced by a plurality of scanners and processed in an associated plurality of processing channels of a character recognition apparatus, the scanners and their associated processing channels being arranged in scanning groups, which threshold circuit includes a plurality of first threshold value setting means each associated with the processing channels of a respective group for establishing a separate threshold value for each group which is dependent upon the highest scanning signal value being produced by the scanners of the respective group, and second threshold value setting means connected to all of the groups for providing a common minimum threshold value for all processing channels, which minimum value is dependent upon the highest scanning signal value being produced by the scanners of all groups, the improvement wherein said second threshold valve setting means comprises a signal distortion circuit connected to produce an output signal whose value is proportional to the common minimum threshold value, said circuit comprising an operational amplifier and feedback means connected between the output and the input of said amplifier to provide non-linear feedback therefor, and said circuit constituting means for causing the value of such output signal to vary nonlinearly with variations in such highest scanning signal value in a manner such that the value of such output signal varies at a rate which increases as the value of such highest scanning signal increases.

2. An arrangement as defined in claim 1 further comprising a plurality of threshold circuit means, each coupled to a respective group of processing channels, each said threshold circuit means also being coupled to said first threshold value setting means of its respective group and to said second threshold value setting means for comparing each of the scanning signals of the associated group with the higher one of the separate threshold value produced by its associated first threshold value setting means and the common minimum threshold value.

3. An arrangement as defined in claim 1 wherein said feedback means comprises a resistor and a transistor having its emitter-collector path connected in parallel with said resistor, the parallel arrangement of said resistor and transistor being connected to said amplifier to form a feedback path therefor.

4. An arrangement as defined in claim 1 wherein each said first means is also connected to the first means of the adjacent groups, for effecting the setting of each of the threshold values by said first means.

5. A circuit as defined in claim 4 wherein said first and second means are interconnected for causing the first threshold value produced by each said first means to be the higher one of a first value equal to a set percentage of the highest scanning signal value being produced by the scanners of the associated group voltage output from the associated first filter means and a second value dependent upon both the common minimum threshold value and the highest scanning signal values being produced by the scanners of the adjacent groups.

6. An arrangement as defined in claim 1 further comprising, for each said group, first maximum amplitude filter means connected to each of the signal processing channels of the respective scanning group for generating an output signal dependent upon the highest scanning signal in said scanning group, and wherein each said first threshold value setting means comprises: setting means connected to said first filter means for producing a signal equal to a set percentage of the voltage output from said first filter means, said setting means including an amplifier means for amplifying the output signal from said first filter means and a resistance network means including first and second resistors and being coupled to the output of said amplifier means for providing the set percentage of the amplified signal in accordance with the ratio between the resistance value of said first resistor and the resistance value of said second resistor; resistance means having inputs connected to receive the output signals from said first filter means of the adjacent groups and the minimum threshold value from said second threshold value setting means, for providing an output signal dependent upon these signals; and further maximum amplitude filter means connected to said setting means and said resistance means for producing an output selected from the higher of the signals therefrom.

7. A circuit as defined in claim 1 wherein each said first threshold value setting means produces a threshold value equal to a set percentage of the highest scanning signal value being produced by the scanners of its associated group.

8. A circuit as defined in claim 1 wherein only one of two scanning groups receives scanning signals at any one time, said two scanning groups have a common first threshold value setting means.

* * * * *